(No Model.)
J. L. STEWART.
INCANDESCENT GAS BURNER.
No. 408,051. Patented July 30, 1889.
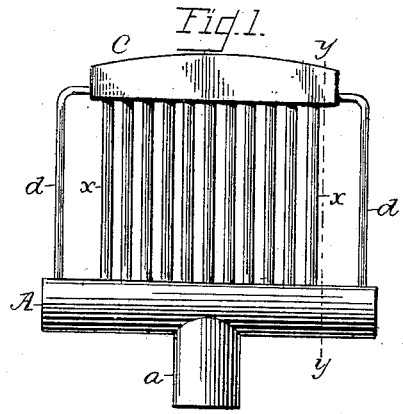
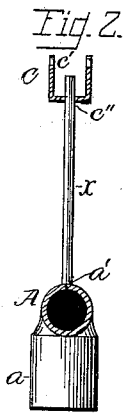
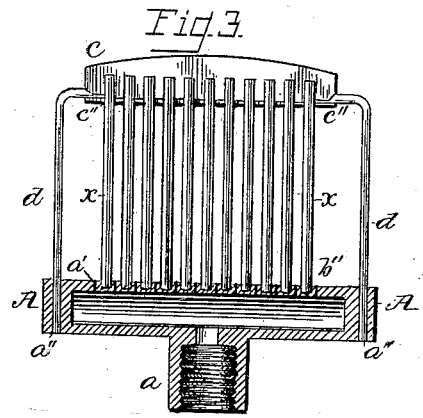
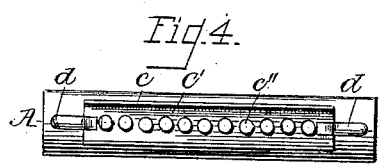
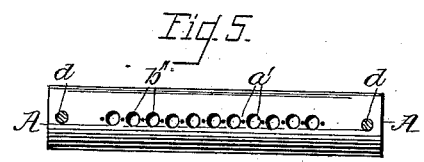
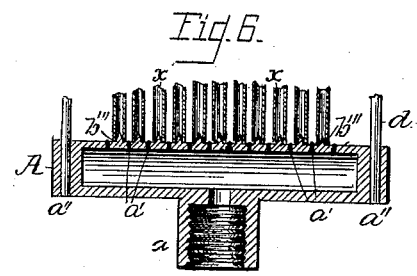
WITNESSES
INVENTOR
John L. Stewart
By E. B. Clark
Atty.

UNITED STATES PATENT OFFICE.

JOHN L. STEWART, OF PHILADELPHIA, PENNSYLVANIA, ASSIGNOR, BY MESNE ASSIGNMENTS, TO THE WELSBACH INCANDESCENT GAS LIGHT COMPANY, OF GLOUCESTER, NEW JERSEY.

INCANDESCENT GAS-BURNER.

SPECIFICATION forming part of Letters Patent No. 408,051, dated July 30, 1889.

Application filed December 27, 1887. Serial No. 259,026. (No model.)

*To all whom it may concern:*

Be it known that I, JOHN L. STEWART, a citizen of the United States, residing at Philadelphia, in the county of Philadelphia and State of Pennsylvania, have invented certain new and useful Improvements in Incandescent Gas-Burners; and I do hereby declare the following to be a full, clear, and exact description of the invention, such as will enable others skilled in the art to which it appertains to make and use the same.

This invention relates to gas-burners adapted more particularly for producing a brilliant white light by the combustion of uncarbureted water-gas or other non-illuminating gas in contact with bodies of refractory material, such as slender cylinders, rods, tubes, or other shapes of filamentary devices which readily become incandescent at a comparatively low temperature.

The objects of this invention are, first, to provide an improved incandescent gas-burner which is simpler in construction, more effective in operation and at the same time more economical in use than those heretofore proposed; second, to provide for supporting the rods or tubes or other device to be made incandescent directly upon the burner-head adjacent to the capillary gas-jet openings, whereby each jet of flame shall impinge directly upon the incandescing material and secure, as near as possible, the full calorific value of the gas consumed.

The construction and operation of my improved burner will now be described in detail with reference to the accompanying drawings, in which—

Figure 1 represents a side elevation of my improved burner with a row of rods or tubes as the incandescing body. Fig. 2 represents a vertical cross-section of the same on the line $y\ y$ of Fig. 1. Fig. 3 represents a vertical longitudinal section thereof. Fig. 4 represents a top plan view with the upper cross-bar in position. Fig. 5 represents a top plan view of the burner-head. Fig. 6 represents a vertical longitudinal broken section of the burner-head with modified details of construction.

It will be readily seen that there might be many other shapes of my burner, and that it might be used in connection with many other incandescing bodies and forms than those above described, the above being enumerated only for the purpose of more clearly and distinctly showing the character and nature and application of my invention.

In carrying out my invention I make a burner composed, essentially, of a perforated burner-head having suitable means adjacent to its perforations for receiving or supporting and holding in place the lower ends of the material to be made incandescent, and a suitably-connected cross-bar or crown-piece supported above the burner-head for receiving, suspending, or holding the same in place.

The burner-head A is formed with a horizontal tubular portion having closed thickened ends, one or more lines of fine perforations consisting of holes or slots $a'$ in its top, and an internally-screw-threaded socket $a$, projecting from its under side for connection with the bracket or gas-service pipe. Between the perforations $a'$ are formed sockets $b''$ or projecting points $b'''$, for receiving, supporting, or holding the lower ends of the incandescing material $x$ in position adjacent to the perforations for exit of the gas-jets $a'$. By supporting the rods or tubes of incandescing material directly upon the burner-heads, the construction is much simplified and the cost of the burners is much reduced, and by holding them close to the capillary perforations the jets of gas-flame are caused to impinge directly upon them and exert their most efficient heating effect with the greatest economy. The thickened ends of tube A are provided with vertical holes $a''$ for receiving and holding the stems or posts $d\ d$, which connect with and support the crown-piece or cross-bar $c$ at a suitable height above the burner-head. The holes and stems may be made tapering from above downward, so that the stems will not slide into the holes any farther than desired, or the stems may be provided with collars. Instead of the vertical holes $a''$, I may provide flattened or angular holes extending longitudinally into the ends of head A, and the stems $d$ may be provided with flattened or angular ends and be sprung into position. The stems or posts $d$ are rigidly secured to the ends of the crown-piece or cross-bar in any desired manner.

The crown-piece or cross-bar $c$ may be stamped up from sheet metal or may be formed of steatite or other suitable refractory material. If made of sheet metal or steatite, it has a groove or channel $c'$ and a row of perforations $c''$, corresponding with the sockets or projecting points in the burner-head, to receive and support the upper ends of the incandescing material. These perforations $c''$ are made sufficiently large to permit the incandescing material to slide freely in them, and thus to permit expansion and contraction under varying temperatures.

The incandescing-bodies $x$ are made of any suitable refractory material especially adapted for becoming incandescent at a low temperature in a gas-flame. The crown-piece or cross-bar being in position, the incandescing rods or tubes are simply placed in position through the perforations of the head or cross-bar into the sockets or over the projecting points of the burner-head and require no cement or other material to hold them in place. The incandescing material can thus be removed and replaced, and where rods or tubes are used in case any one should become bent or broken a new one can be readily substituted without disturbing the others. If desired, however, the incandescing material, after being set in the crown-piece, may be secured by cement or a plastic compound or any suitable mechanical device, and for this purpose, where metal or steatite is used, I provide a groove or channel $c'$ in the cross-bar. The groove or channel, however, may be dispensed with if this is not desired and an ornamental crown-piece be substituted. The incandescing material passes through the openings in cross-bar $c$ and projects above from one-eighth to a quarter of an inch, so that in case of contraction it will not fall out or away from its support.

The burner-head may be made square in cross-section or of any other suitable shape, and several burner-heads may be clustered together in the form of a triangle, a square, or other polygonal form, or it may be made of annular form. They may also be arranged in the form of a cross or star the arms of which radiate from a central socket, by which the whole is connected to the gas-service pipe.

Instead of arranging the rods or tubes, when they are used, in vertical lines, they may with good effect be arranged in slanting single or double rows so as to cross each other at any desired angle, whereby the flame is caused to hug them all the way up, the heat is better utilized, and a greater candle-power or illuminating effect is produced with a given consumption of gas.

In another application, Serial No. 258,124, filed December 16, 1887, I have described and claimed the combination of a burner-head having a series of fine perforations or gas-exits, a saddle (or burner-tap) supported on the burner-head above said gas-exits and forming an intermediate gas and air mixing chamber, the saddle being provided with a series of sockets and a series of gas-exits, (which sockets and gas-exits may be concentric,) a cage or frame supported above the saddle, and a series of incandescing cylinders or tubes supported by said cage and saddle. Such construction I do not claim herein.

Having described my invention, what I claim, and desire to secure by Letters Patent, is—

1. In an incandescent gas-burner, the combination of a burner-head having a number of fine perforations or gas-exits and provided with means for supporting a series of incandescent cylinders, a perforated crown-piece or cross-head supported above said burner-head, and a series of incandescing-cylinders supported by said crown-piece and burner-head, substantially as described.

2. In an incandescent gas-burner, the combination of a burner-head having a number of fine perforations or gas-exits $a'$ and a series of projecting points $b'''$, a perforated crown-piece or cross-head supported above said burner-head, and a series of incandescing-tubes supported by said crown-piece and burner-head, substantially as described.

In testimony whereof I affix my signature in presence of two witnesses.

JOHN L. STEWART.

Witnesses:
CHAS. MATHEWS, Jr.,
ELLA C. NEWBOLD.